United States Patent [19]

Sheets

[11] Patent Number: 5,207,060
[45] Date of Patent: May 4, 1993

[54] TANDEM HYDRAULIC MOTOR

[75] Inventor: James B. Sheets, Ames, Iowa

[73] Assignee: Sauer, Inc., Ames, Iowa

[21] Appl. No.: 753,800

[22] Filed: Sep. 3, 1991

[51] Int. Cl.$^5$ .......................................... F16D 31/02
[52] U.S. Cl. ...................................... 60/483; 60/484; 180/242
[58] Field of Search ............... 60/445, 483, 484, 485; 180/242, 245

[56] References Cited

U.S. PATENT DOCUMENTS

| 1,294,121 | 2/1919 | Lape | 60/485 |
| 2,562,363 | 7/1951 | Nixon | 91/473 |
| 2,588,866 | 3/1952 | Moon | 60/468 |
| 3,508,401 | 4/1970 | Aplin | 60/468 |
| 3,990,235 | 11/1976 | Bauchet | 60/483 |
| 4,262,768 | 4/1981 | Atatani et al. | 180/242 |
| 5,159,992 | 11/1992 | Reinecke et al. | 60/484 |

FOREIGN PATENT DOCUMENTS 2650752  5/1977  Fed. Rep. of Germany ........ 60/483

Primary Examiner—Edward K. Look
Assistant Examiner—F. Daniel Lopez
Attorney, Agent, or Firm—Zarley, McKee, Thomte, Voorhees & Sease

[57] ABSTRACT

A variable displacement hydraulic motor has a motor housing with a fluid inlet and a fluid outlet. A pair of hydraulic displacement units are mounted in the housing in a parallel arrangement and are operatively associated with a common output shaft. The common output shaft is supported for rotation within the housing and has a pair of spaced ends extending outside the housing, one of the ends driving a first axle shaft and the other end driving a second axle shaft. Each motor unit has a rotatable cylinder block with reciprocable pistons communicating with the fluid inlet and the fluid outlet and an angularly positionable swashplate for varying the stroke of the pistons. A minimum-maximum servo regulates the position of each swashplate independently to provide a wide range of output of the hydraulic motor.

1 Claim, 3 Drawing Sheets

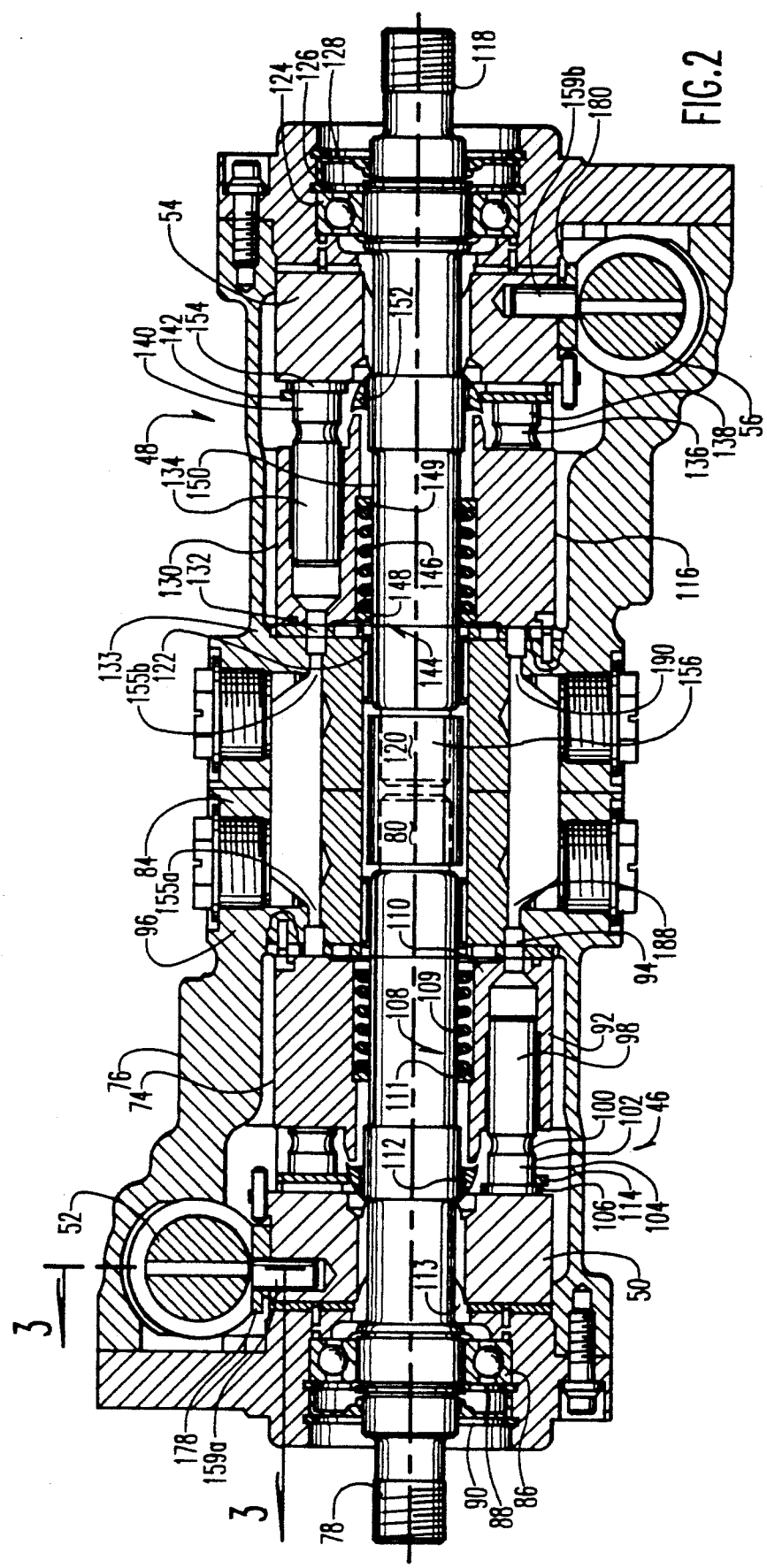

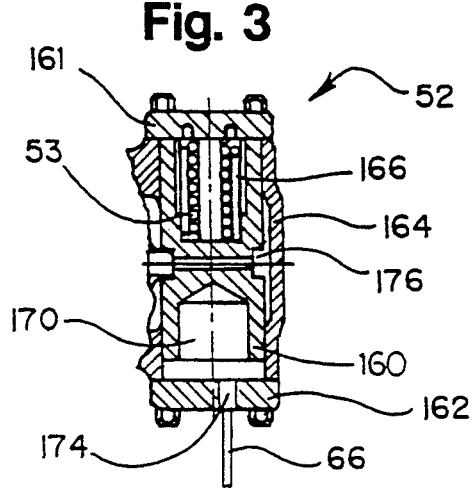
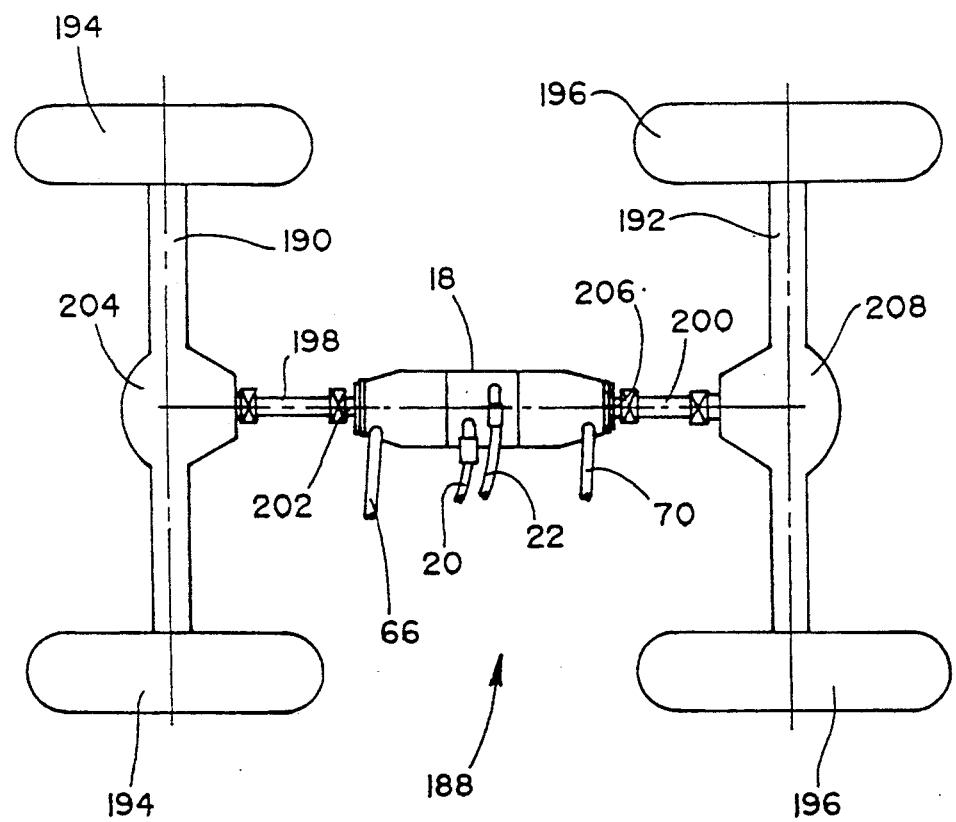

TANDEM HYDRAULIC MOTOR

TECHNICAL FIELD

This invention generally relates to a hydraulic motor and, more particularly, to a hydraulic motor designed for use in the transmission of a hydrostatically propelled vehicle and which provides a wide range of motor speed and torque output.

BACKGROUND OF THE INVENTION

Hydrostatic transmissions are used to transmit power from a prime mover, such as an internal combustion engine, to an output shaft for driving external devices, such as the axle of a motor vehicle. Present hydrostatic transmissions include a hydraulic pump having an input shaft which is driven by the prime mover. A hydraulic fluid is pumped from the hydraulic pump to a hydraulic motor for driving an output shaft, with no mechanical linkage between the pump input shaft and the motor output shaft.

Hydraulic pumps of the axial piston type have a cylinder block rotatable with the input shaft and pistons axially movable within the cylinder block, with the displacement of the hydraulic pump being variable and proportional to the stroke of the pistons. The pump has a tiltable swashplate which engages the pistons as the cylinder block rotates to vary the stroke of the pistons and, therefore, the displacement of the pump. By changing the tilt angle of the swashplate, a broad range of flow rates to the motor can be achieved. At the neutral position of the swashplate, the pistons are not stroked and no fluid is pumped to the motor. In this position the input shaft imparts no motion to the motor shaft. When the pump swashplate is rotated away from the neutral position, the pistons are stroked as the cylinder block rotates and hydraulic fluid is pumped to the motor.

Hydraulic motors also can be of the axial piston type. Similar to the above described variable displacement hydraulic pump, an axial piston motor has reciprocating pistons which engage a tiltable swashplate, with the stroke of the pistons determining the amount of torque to the motor output shaft from the fluid pumped to the motor. With the motor swashplate in a neutral position, the pistons are not stroked and the motor output shaft is not rotated, regardless of the displacement of the hydraulic pump. When the motor swashplate is tilted away from the neutral position, the motor pistons are stroked and the output shaft is driven by the flow of hydraulic fluid through the transmission. Thus, the output performance of the hydrostatic transmission is a function of the prescribed displacements of both the hydraulic pump and the hydraulic motor.

In the design of typical on/off road vehicles which have hydrostatic propulsion and operation of a mechanical drawbar, it often is necessary to provide a selectable gear ratio between the hydraulic motor and the drive axles to obtain the desired vehicle speed and drawbar pull, depending on the particular use being made of the vehicle. In a variable displacement hydraulic motor, the position of the motor swashplate directly determines the speed of the motor output shaft, with excess energy being provided as output torque capability of the motor. It therefore is possible to control the relationship between motor speed and motor torque which is applied to the drive axles by appropriately positioning the motor swashplate. Likewise, vehicle speed and drawbar pull are determined by the motor swashplate position.

In many situations, however, the limited displacement range of the motor swashplate is insufficient to satisfy the range of performance requirements placed on the hydrostatic transmission. In order to increase the range of performance, a gearbox is connected between the motor output shaft and the drive axles to achieve the necessary ratios of speed and torque. The requirement of a gearbox adds mechanical complexity to the overall drive train, which detrimentally impacts reliability as well as cost of the drive train. An additional problem lies in the space requirements presented by the provision of a gearbox.

One approach to varying the range of performance of a hydraulic device is shown in U.S. Pat. No. 3,093,081 to Budzich, dated Jun. 11, 1963. Budzich shows a pumping device in which a common drive shaft rotates the cylinder blocks of two variable displacement pumps. Each of the pumps has a tiltable swashplate to vary the displacement thereof. The range of pump displacements is selected so that the combined output of the pumps satisfies peak requirements of a hydraulic system. Budzich is not concerned with a transmission, however, and makes no suggestion of controlling the manner in which power is transmitted to propel a vehicle.

U.S. Pat. No. 2,562,363 to Nixon, dated Jul. 31, 1951 shows a motor unit having two separate motors. One of the motors has a positionable swashplate to vary the displacement of the motor and the other motor has a fixed displacement. The range of operation of the compound unit is limited to the displacement range of the single variable displacement motor in combination with the fixed displacement of the second motor. Further, in order to position the single variable swashplate of Nixon, an arm is directly linked to a pressure regulator mechanism and there is no capability for prescribing a desired swashplate angle.

The present invention is directed toward overcoming the problems set forth above in a novel and useful way.

SUMMARY OF THE INVENTION

It is an object, therefore, of this invention to provide a new and improved hydraulic motor for use in a hydrostatically propelled vehicle.

In the exemplary embodiment of the invention, a variable displacement hydraulic motor has a motor housing with a fluid inlet and a fluid outlet. A pair of hydraulic displacement units are mounted in the housing in a parallel arrangement and are operatively associated with a common output shaft. Each motor unit has a rotatable cylinder block with reciprocable pistons communicating with the fluid inlet and the fluid outlet and an angularly positionable swashplate for varying the stroke of the pistons. A pair of servos regulate the position of each swashplate independently to provide a wide range of output of the hydraulic motor.

The common output shaft is supported for rotation within the housing and has a pair of spaced ends extending outside the housing, one of the ends driving a first axle shaft and the other end driving a second axle shaft. Because the axles are driven by a common shaft, the first axle shaft and the second axle shaft are spaced apart in a substantially collinear relationship. Likewise, because the shaft extends through the motor the shaft advantageously serves as a connecting sleeve for both axles which assures that each axle rotate at the same speed.

In the preferred form of the invention, each servo is a two-position minimum-maximum device having an axially movable servo piston for regulating a supply of control fluid to the swashplate. Each servo piston is movable between a first position for prescribing a minimum displacement of the corresponding motor unit, and a second position for prescribing a maximum displacement of the corresponding motor unit. The two servos thus are operable in combination to provide a three-speed operation of the output shaft for a given pump flow. The output shaft assumes a first output speed with the first servo in the first position and the second servo in the first position. The output shaft assumes a second output speed with the first servo in the first position and the second servo in the second position. The output shaft assumes a third output speed with the first servo in the second position and the second servo in the second position.

Alternatively, the servos may be continuously positioned by means of mechanical feedback controls to provide infinitely variable positions of the motor swashplates.

This invention envisions that the hydraulic motor be used in a hydrostatic transmission in the drive train of a four-wheel drive vehicle. The motor is connected between a pair of spaced parallel drive axles, with the motor output shaft extending transversely through the housing in substantially perpendicular relationship to the drive axles. The ends of the shaft extending oppositely outside the housing, with each shaft end drivingly coupled with one of the drive axles by an intermediate drive shaft.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and advantages, can be understood from the following description taken in conjunction with the accompanying drawings, in which like reference numerals identify like elements in the figures and in which:

FIG. 2 is a vertical section of the tandem hydraulic motor represented in FIG. 1;

FIG. 3 is a section taken along line 3—3 of FIG. 2; and

FIG. 4 is a diagrammatic illustration of a four-wheel drive vehicle having a tandem hydraulic motor.

DETAILED DESCRIPTION

Figure 1:
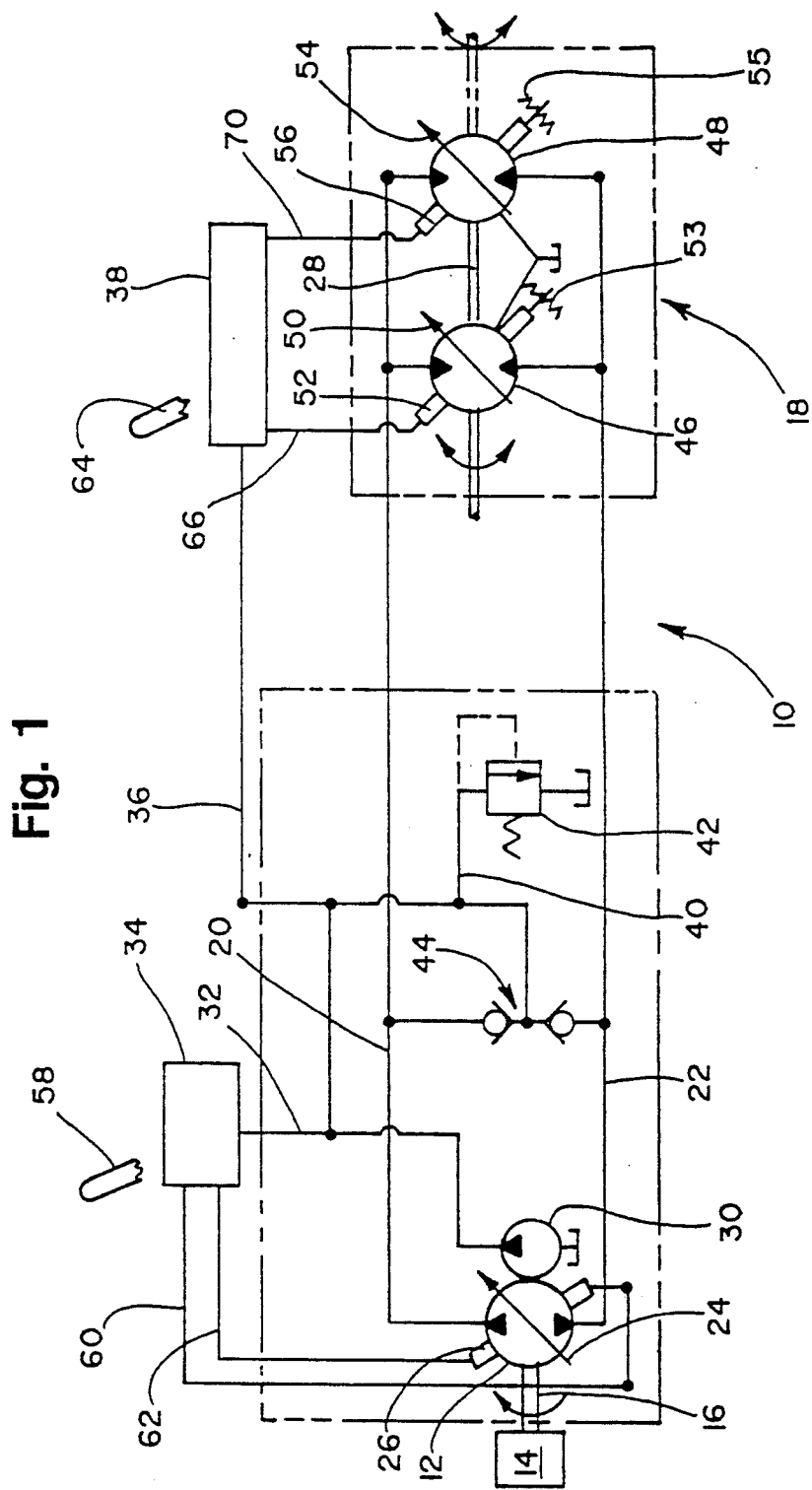
FIG. 1 is a schematic illustration of a hydrostatic transmission having a tandem hydraulic motor according to the present invention.

The present invention is directed to a hydraulic motor designed for use in a power transmission, generally designated 10 in FIG. 1, of the type typically employed in a hydrostatically propelled vehicle. The transmission has a hydraulic pump 12 driven by a prime mover 14 through a pump input shaft 16 and a tandem hydraulic motor according to the present invention, indicated generally at 18. Hydraulic pump 12 and tandem hydraulic motor 18 are interconnected by a pair of hydraulic lines 20 and 22 to form a closed hydraulic main loop. Hydraulic pump 12 is of a reversible variable displacement type as schematically shown and includes a swashplate 24 operated by a fluid actuated servo mechanism 26. The position of swashplate 24 determines the amount and direction of flow from hydraulic pump 12 to tandem hydraulic motor 18 to provide a reversible drive of a motor output shaft 28.

A fixed displacement charge pump 30 is associated with hydraulic pump 12 and provides both a source of control fluid and a source of makeup fluid for the main loop. The flow from charge pump 30 proceeds through a fluid line 32 to a pump displacement control 34, through a fluid line 36 to a motor displacement control 38, and through a line 40 to a charge relief valve 42 and a pair of check valves 44. Charge pump 30 thereby provides makeup fluid to either main loop line 20 or 22, depending on which side is the low pressure side of the main loop, as is known in the prior art.

Tandem hydraulic motor 18 also is of the reversible variable displacement type and includes a pair of variable displacement hydraulic units 46 and 48 mounted in a parallel arrangement for driving common motor output shaft 28. As will be described in detail below, motor unit 46 includes a tiltable swashplate 50 operated by a fluid actuated servo mechanism 52. Motor unit 48 has a tiltable swashplate 54 operated by a fluid actuated servo mechanism 56. Together, the position of motor swashplates 50 and 54 varies the amount of torque and speed transferred from prime mover 14 to motor output shaft 28 by regulating the fluid pumped through lines 20 and 22.

Pump displacement control 34 is operable by means of a rotatable lever 58 and includes mechanical swashplate feedback. Swashplate feedback provides for regulation of control fluid through lines 60 and 62 to opposite ends of servo mechanism 26 to position swashplate 24 and thereby prescribe the amount and direction of flow to tandem hydraulic motor 18. Motor displacement control 38 is operable by means of a lever 64 and also includes mechanical swashplate feedback. Feedback of the motor swashplate provides regulation of control fluid through a pair of lines 66 and 70 to servos 52 and 56, respectively, for positioning motor swashplates 50 and 54, respectively.

The foregoing description is typical of a hydrostatic transmission in which power is transmitted from a pump input shaft to a motor output shaft, with no mechanical connection between the pump and the motor. The structure of the tandem hydraulic motor which provides a broad range of control over the relationship between the pump input and the motor output shaft speed and torque characteristics now will be described in detail.

Each of variable displacement motor units 46 and 48 are shown in detail in FIGS. 2 and 3, with components comparable to those described with reference to FIG. 1 having the same reference number. Motor unit 46 has a rotatable cylinder block 74 positioned within a motor housing 76 and has an internal bore splined to a driven output half-shaft 78. The half-shaft has a reduced diameter end 80 rotatably supported by a needle bearing 82 in a center section 84 of a motor housing 76. The outboard end of half-shaft 78 is rotatably supported and axially located by a ball bearing 86 seated in a recess in the housing, with the ball bearing held in place by a retaining ring 88. A lip seal 90 surrounds the shaft and seals the interior of the motor housing.

Rotatable cylinder block 74 has a series of piston receiving chambers 92 spaced about the axis of rotation of half-shaft 78, each of which has an opening 94 to a valve plate 96 abutting center section 84. Each of the piston receiving chambers has a piston 98 reciprocal therein. The pistons can be of a conventional construction, with a spherical end 100 rockably mounting a slipper 102. A cylindrical part 104 of the slipper has a spherical recess to receive the spherical end 100 of the piston and a slipper foot 106 which is engageable with swashplate 50 which controls the reciprocal movement of the pistons.

The slippers are urged into following engagement with swashplate 50 by a means of keel-type hold down assembly 108. Hold down assembly 108 includes an axial spring 109 sandwiched between a pair of retaining washers 110 and 111, with retaining washer 110 abutting valve plate 96 and retaining washer 111 engaging a number of circumferentially spaced hold down pins 112 guided for axial movement in grooves formed along the periphery of half-shaft 78. The hold down pins are biased axially into engagement with a spherical retainer bearing 113 mounted concentrically about half-shaft 78 and in engagement with an annular slipper retainer 114. The slipper retainer is shaped similar to a telephone dial and has a number of circumferentially spaced circular openings each loosely receiving a cylindrical part 104 of a slipper 102.

Motor unit 48 generally is identical to motor unit 46 and has a rotatable cylinder block 116 positioned within motor housing 76 and has an internal bore splined to a driven output half-shaft 118. Half-shaft 118 has a reduced diameter end 120 rotatably supported by a needle bearing 122 in center section 84 of a motor housing 76. The outboard end of half-shaft 78 is rotatably supported and axially located by a ball bearing 124 seated in a recess in the housing, with the ball bearing held in place by retaining ring 126. A lip seal 128 surrounds the shaft and seals the interior of the motor housing.

Rotatable cylinder block 116 has a series of piston receiving chambers 130 spaced about the axis of rotation of half-shaft 118, each of which has an opening 132 to a valve plate 133 abutting center section 84 opposite valve plate 96. Each of the piston receiving chambers has a reciprocal piston 134 with a spherical end 136 rockably mounting a slipper 138. A cylindrical part 140 of the slipper has a spherical recess to receive the spherical end 136 of the piston and a slipper foot 142 which is engageable with swashplate 54 to control the reciprocal movement of the pistons.

The slippers are urged into following engagement with swashplate 54 by means of a keel-type hold down assembly 144. Hold down assembly 144 includes an axial spring 146 sandwiched between a pair of retaining washers 148 and 149, with retaining washer 148 abutting valve plate 96 and retaining washer 149 engaging axially movable hold down pins 150. The hold down pins are biased into engagement with a spherical retainer bearing 152 mounted concentrically about half-shaft 118 and in engagement with an annular slipper retainer 154. The slipper retainer is similar to slipper retainer 114 and has a number of circumferentially spaced circular openings each loosely receiving a cylindrical part 140 of a slipper 138.

Center section 84 has a pair of fluid passages 155a and 155b receiving fluid under pressure from common fluid line 20 (FIG. 1). Fluid passage 155a supplies fluid to cylinder block 74 though an arcuate opening in valve plate 96 and the openings 94 in each piston-receiving chamber 92. Fluid under pressure tends to stroke pistons 98 and thereby produce a rotation of cylinder block 74 and half-shaft 78. Fluid passage 155b supplies fluid to cylinder block 116 though an arcuate opening in valve plate 133 and the openings 132 in each piston-receiving chamber 130. Fluid under pressure tends to stroke pistons 134 and thereby produce a rotation of cylinder block 116 and half-shaft 118.

The half-shafts 78 and 118 are joined at their inner ends 80 and 120, respectively, by a cylindrical shaft coupling 156 such that the half-shafts are rigidly linked and define common motor output shaft 28. In this way, rotation of cylinder blocks 74 and 116 each contribute to the amount of torque transmitted to the motor output shaft, with the position of each of swashplates 50 and 54 defining the torque contribution of motor units 46 and 48, respectively.

A pair of fluid passages 188 and 190, respectively, communicate with rotatable cylinder blocks 74 and 116, respectively, to return hydraulic fluid from motor 18 through fluid line 22. Hydraulic fluid thereby is continuously pumped through main fluid lines 20 and 22 and hydraulic motor 18 by variable displacement pump 10.

The angle of swashplate 50 is controlled by fluid actuated servo 52 mounted within motor housing 76 and mechanically linked with the swashplate by a mechanical link 159a. The angle of swashplate 54 is controlled by a fluid actuated servo 56 mounted within motor housing 76 and mechanically linked with the swashplate by a mechanical link 159b.

Servos 52 and 56 are generally of the same construction, with servo 52 shown in detail in FIG. 3 having an axially movable servo piston piston 160 captured between spaced end covers 161 and 162 and engaging a generally cylindrical sidewall 164 defined in motor housing 76. Servo piston 160 has an outwardly opening recess 166 formed at one end thereof receiving servo spring 53. An oppositely opening recess 170 is formed in the other end of the servo piston and communicates with fluid line 66 through a hole 174 tapped in end cover 162. An in-turned, generally horizontal groove 176 is formed on the periphery of servo piston 160 at approximately the mid-line thereof. Referring also to FIG. 2, groove 176 seats a sleeve bearing 178 attached to link 159a. Axial displacement of servo piston 160 thereby is effective to produce an angular displacement of swashplate 50 and a corresponding change in the stroke of pistons 98 as cylinder block 74 rotates with half-shaft 78. Although not shown in detail, servo 56 has a construction similar to servo 52 and engages a sleeve bearing 180 formed on link 159b to vary the position of swashplate 54.

It is believed that the operation of hydrostatic transmission 10 and tandem hydraulic motor 18 can be understood from the foregoing and may be briefly summarized as follows. Lever 58 on pump displacement control 34 is manually actuated to position swashplate 24 of hydraulic pump 12 and thereby establish an amount and direction of flow from the pump to tandem hydraulic motor 18. Fluid is supplied through line 20 to passages 155a and 155b which communicate fluid with rotatable cylinder blocks 74 and 116, respectively. Lever 64 on motor displacement control 38 is actuated to meter control fluid from charge pump 30 to servos 52 and 56. Although displacement controls 34 and 38 are shown generally as separate controls in FIG. 1, it should be understood that the present invention envisions optional incorporation of the two controls into a single control unit. Further, while a manual lever input is shown for each of the displacement controls 34 and 38, the present invention is fully operable and comprehends the use of any type of control suitable for metering control fluid to a fluid actuated control means for positioning a tiltable swashplate on a hydraulic unit. Examples of other existing technology controls are hydraulic piloted displacement controls, system pressure compensate controls, electric displacement controls which utilize a servo valve, and pulse-width modulated solenoid controls.

As described above with respect to FIG. 3, servo 52 is of a minimum-maximum type in which servo piston 160 is axially movable between first and second positions in which, alternatively, maximum or minimum displacement of motor unit 46 is achieved. With no control fluid supplied to servo chamber 170, piston 160 is spring biased into a first position in which the resulting position of swashplate 50 prescribes a maximum stroke of pistons 98. When control fluid is supplied through line 66 into servo chamber 170, the servo piston compresses spring 53 and positions swashplate 50 such that pistons 98 have a minimum stroke. Similarly, servo 56 is a minimum-maximum control which, in the absence of control fluid, prescribes a maximum stroke position of swashplate 54. Actuation of servo 56 results in rotation of swashplate 54 such that the stroke of pistons 134 is minimized.

Tandem hydraulic motor 18 thus provides a three-way modification of power transmitted from pump input shaft 16 to motor output shaft 28. With each of motor swashplates 50 and 54 in a maximum displacement condition, as when no control fluid is supplied to servos 52 and 56, respectively, output shaft 28 is driven directly by hydraulic fluid in line 20 pumped by variable displacement pump 12. In this scenario, the position of pump swashplate 24 prescribes the output of motor shaft 28 over a first range of operation of the transmission.

When one of motor swashplates 50 or 54 is rotated to a minimum displacement position, as by a manual input applied to lever 64 and a corresponding actuation of one of servos 52 or 56, respectively, motor units 46 and 48 combine to regulate the output of shaft 28. In this scenario, variations in the displacement of hydraulic pump 12 regulate the shaft output of tandem hydraulic motor 18 over a second range of operation.

Finally, with each of motor swashplates 50 and 54 positioned in a minimum displacement configuration, variation in the position of pump swashplate 24 regulates the power transmitted from input shaft 16 to motor output shaft 28 over a third range of operation. Thus, for a particular position of swashplate 24, the servos are adapted to provide a selective three-speed operation of output shaft 28.

If one of the motor swashplates is infinitely controlled by displacement control 38, it is possible to position the swashplate perpendicular to the drive shaft to accomplish a zero displacement position. This capability provides the possibility of a fourth effective tandem motor displacement to generate still greater motor shaft speed when one motor is at minimum displacement and the other motor is at zero displacement.

The difference in drive torque transmitted by the tandem motor in each of the three motor operating conditions is inversely proportional to the difference in shaft speed, such that with both motor swashplates in a maximum displacement/minimum shaft speed position, maximum torque will be transmitted by the motor. Conversely, with both motor swashplates in a minimum displacement/maximum shaft speed position, minimum torque will be transmitted by the motor. Consequently, the range of speed and torque which can be achieved with the present invention is greater than that transmitted by the prior devices having only a single variable-displacement motor unit.

The present invention is particularly well-suited for incorporation in the drive train of a four wheel drive vehicle, as generally designated 189 in FIG. 4, and having a pair of spaced apart parallel drive axles 191 and 192 each having oppositely mounted drive wheels 194 and 196, respectively. A tandem hydraulic motor 18 according to the invention is incorporated in a power transmission for hydrostatically propelling four wheel drive vehicle 189 and supplying drive torque to each of axles 191 and 192. The through-shaft construction of motor 18 facilitates the synchronous driving of axles 191 and 192 through transmission shafts 198 and 200. Transmission shaft 198 is connected at one end to an end 202 of the motor output shaft and transmits torque therefrom to drive axle 191 through a differential gear 204. Transmission shaft 200 is connected to an end 206 of the motor shaft and transmits torque therefrom to drive axle 192 through a differential gear 208. Because motor shaft ends 202 and 206 are joined for synchronous rotation by shaft coupling 156, torque is transmitted to differential gears 204 and 208 for accurately controlling the drive speed of axles 191 and 192, respectively.

The use of a common through shaft to supply drive torque to each of axles 191 and 192 permits a simple in-line construction in which transmission shafts 198 and 200 extend in a collinear relationship between motor 18 and differential gears 204 and 208, respectively. As noted above, the wide displacement ratios attainable with tandem hydraulic motor 18 eliminate the need for additional gearing when the motor displacement is appropriately selected, and thereby are particularly well-suited to providing a simple drive line with a wide range of performance capability.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:
1. In a four-wheel drive vehicle, a combination mechanical and closed-circuit hydrostatic drive train comprising: at least four wheels;
   a prime mover for providing rotational power to said wheels whereby said vehicle is propelled;
   a front axle extending transversely across said vehicle and having two ends drivingly connected to two of said wheels;
   a rear axle extending parallel to said front axle and having two ends drivingly connected to the other two of said four wheels;
   a pair of differential gearboxes, each intermediate of said axle ends on said front and rear axles, for transmitting and redirecting rotational power from said prime mover to said axles and wheels;
   a closed-circuit hydrostatic transmission interconnected between said front and rear axles and said prime mover for reversibly driving said wheels, having
   a source of control fluid;

a hydraulic pump with infinite displacement control having an input shaft driven by said prime mover;

a dual-output, in-line tandem hydraulic motor drivingly connected to said differential gearboxes to form an integrated, generally horizontal, interaxle driveline extending between said axles and in closed-circuit reversible fluid communication with the hydraulic pump, the in-line tandem hydraulic motor having a housing having a front section, a rear section, and a center section for joining said front and rear sections and for fluidly connecting said pump to said tandem motor;

a common output shaft having a pair of spaced ends extending coaxially through said housing in substantially perpendicular relation to said front and rear axles, said output shaft ends being synchronously connected through said differential gearboxes to drive said axles and prevent spinout should one of said axles lose traction;

a pair of first and second hydraulically parallel variable displacement motor units disposed in said front and rear housing sections respectively and operatively associated with said common output shaft, each said motor unit having a rotatable cylinder block with reciprocable pistons communicating with said hydraulic pump, each said motor unit having an angularly positionable swashplate for prescribing the stroke of said reciprocable pistons, each said motor unit having a valve plate between said housing center section and said cylinder block for fluidly connecting said cylinder block with said center section;

servo means connected with said source of control fluid for generating a fluid force effective to actuate said servo means and modulate the position of said angularly positionable swashplates thereby varying the displacement of the first and the second motor units to control the power transmitted from the pump input shaft to the motor output shaft, such that with said first and second swashplate in a maximum displacement position a first operating range for said tandem hydraulic motor is defined, and with said first swashplate in a maximum displacement position and said second swashplate in a minimum displacement position a second operating range for said tandem hydraulic motor is defined, and with said first swashplate in an intermediate displacement position and said second swashplate in a minimum position a third operating range for the hydraulic motor is defined, and with the first swashplate at zero displacement and the second swashplate at a minimum displacement a fourth operating range for the hydraulic motor is defined.

* * * * *